Patented Apr. 29, 1941

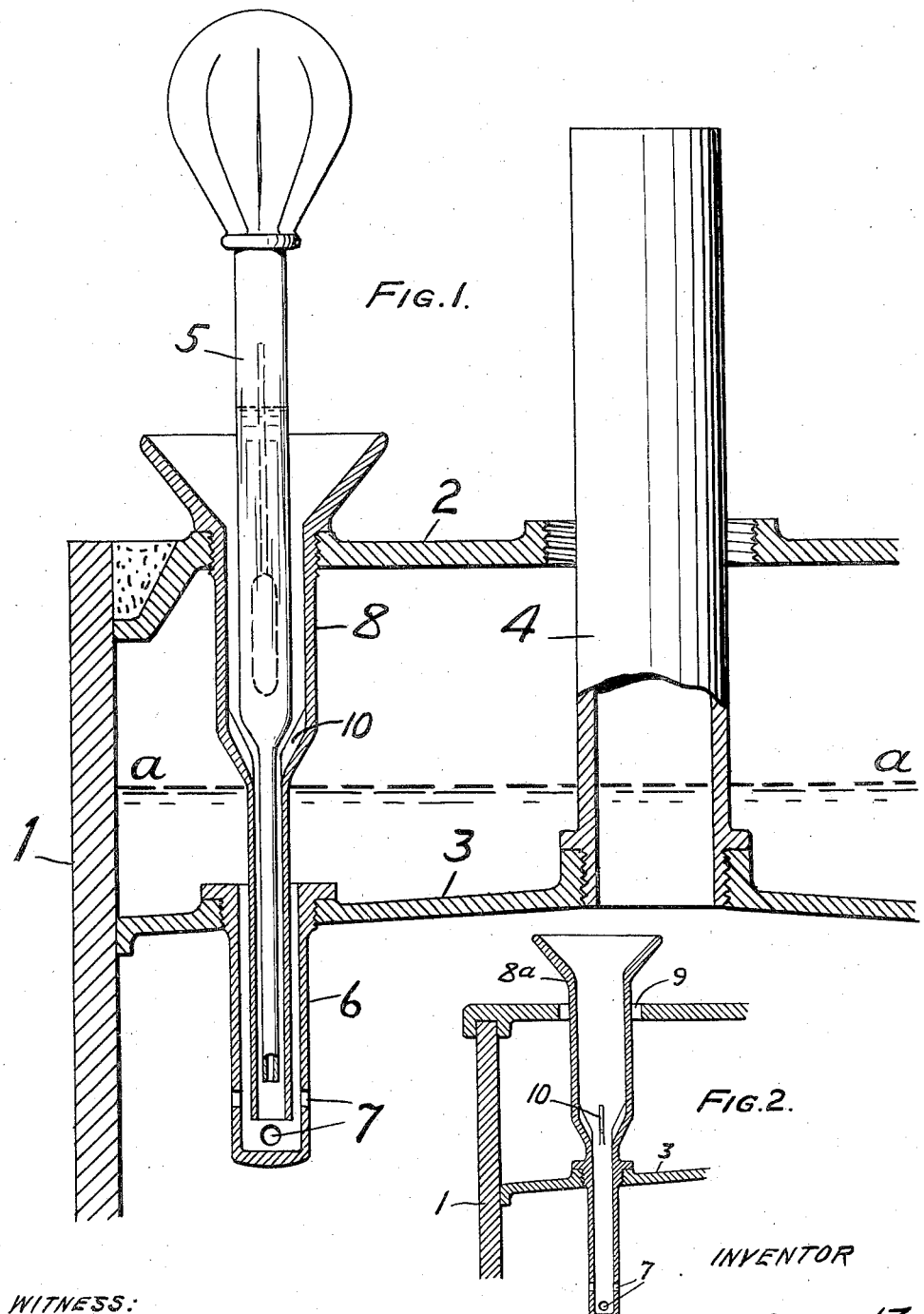

2,240,464

UNITED STATES PATENT OFFICE 2,240,464

STORAGE BATTERY

Edward W. Smith, Philadelphia, Pa., assignor to The Electric Storage Battery Company, Philadelphia, Pa., a corporation of New Jersey Application February 24, 1939, Serial No. 258,244

6 Claims. (Cl. 136—182)

The present invention relates to storage batteries of the type having an outer cover arranged above the level of the electrolyte and a gas or supplementary cover arranged beneath the level of the electrolyte and provided with a vent tube opening through the gas cover and extending past the outer cover.

By the term "gas cover" I mean the device referred to by that term in my Patent 2,027,310; that is to say, a supplementary cover arranged beneath the electrolyte level and provided with a vent tube passing through the outer cover and terminating at the under side of the gas cover, said gas cover and vent tube designed to collect and discharge above the outer cover the gases given off by the plates without trapping the same, so as to prevent the accumulation of substantial amounts of such gases in the cell.

The principal object of the invention is to provide means for reading the specific gravity of the electrolyte at a point below the gas cover, which is necessary because the electrolyte below the gas cover is directly responsive to the condition of the cell, whereas the electrolyte above the gas cover, owing to its partial isolation from that below, is not so directly responsive.

It should be noted that the main vent tube provides the means for reading the gravity as thus specified, but is not suitable to be used for this purpose because this tube constitutes the main vent for oxygen and hydrogen liberated in the cell, which are likely to explode from the occurrence of a static spark that may be caused by introducing a hydrometer syringe into this tube, and, moreover, the main vent tube is generally provided with a series of baffle plates which would have to be removed in order to insert the hydrometer syringe.

The present invention includes an entirely independent tube for the sole purposes of taking readings of the electrolyte and of adding water to replace evaporation, so arranged that no explosive gases, subject to ignition by an accidental spark, static or otherwise, can accumulate therein.

Other objects of the invention will appear from the following description at the end of which the invention will be claimed.

Generally stated, the invention comprises a well depending from the gas cover into the electrolyte and having a closed bottom and an apertured side wall for the entrance of electrolyte and past which gas rises on its way to the outlet tube and a guide tube aligned with the well and arranged through the outer cover and adapted to guide the nozzle of an hydrometer syringe into the well.

The invention also comprises the improvements to be presently described and finally claimed.

In the following description reference will be made to the accompanying drawing forming part hereof and in which, Figure 1 is a cross sectional view of a portion of a storage battery cell embodying features of the invention, and Figure 2 shows a modification.

In the drawing, Fig. 1, indicates a portion of a storage battery container having an outer cover 2 arranged above the level $a$—$a$ of the electrolyte. 3 indicates a solid gas cover having a rim contacting with the vertical walls of the container and arranged beneath the level of the electrolyte. 4 indicates a vent tube opening through the gas cover and extending past the outer cover 2.

There are means permitting the electrolyte to be tested by a syringe hydrometer 5. These means comprise a well 6 depending from the gas cover 3 and having a closed bottom and a side wall apertured at 7 for the entrance of the electrolyte. Gas rises past these apertures 7 without entering the well 6 on its way to the vent tube 4. These means also include a guide tube 8 arranged through the outer cover 2 and depending into the well 6 and communicating at its open end with the electrolyte in the well. The guide tube 8 is adapted to guide the stem of the hydrometer 5, and is preferably arranged with clearance throughout so that water for replacing evaporation may be introduced into the open funnel 8 and passed down to the cell without removal of the hydrometer syringe. For this purpose spaced guide ribs 10 may be provided.

It will be readily apparent that in attending the cell for taking hydrometer readings, replacing water, etc., any sparks from static electricity, or otherwise, are likely to occur at or near the funnel of the tube 8, where no explosive gas may accumulate. The attendant is not likely to cause a spark at a point near the mouth of the main vent tube 4, where they would be likely to cause a mild explosion, harmless, it is true, but nevertheless somewhat disturbing to the equanimity of the attendant or to persons working in the immediate neighborhood.

As shown the well 6 is provided at its upper end with a head and is screwed through a threaded aperture in the gas cover 3. Any other means for providing a gas tight joint might be used. The guide tube 8 is provided at its upper end with a funnel shaped head and is screwed through a threaded aperture in the outer cover 2.

The construction and mode of operation of the modification shown in Fig. 2 are as above described except that in Fig. 2, the well 6 and guide tube 8 are combined into a single structure. In order to provide for the possibility of imperfect alignment between the openings in the upper cover and the gas cover, the opening 9 in the upper cover is made large enough to provide considerable clearance around the tube 8a.

It will be obvious to those skilled in the art to which the invention relates that modifications may be made in details of construction and arrangement without departing from the spirit of the invention which is not limited to such matters or to matters of mere form or otherwise than the prior art and the appended claims may require.

I claim:

1. In a storage battery cell having an outer cover arranged above the level of the electrolyte, and a supplementary cover arranged beneath the level of the electrolyte, there being a vent tube opening through the supplementary cover and terminating at its under surface and extending past the outer cover, means permitting the electrolyte to be tested by a syringe hydrometer which comprise a well depending from the supplementary cover into the electrolyte and having apertures in the side walls near its lower end, and having a bottom impervious to gas bubbles so that gas generated within the cell may rise around without appreciably entering said well, and an opening in the outer cover registering with said well to permit the entrance of said syringe hydrometer.

2. In a storage battery cell having an outer cover arranged above the level of the electrolyte, and a supplementary cover arranged beneath the level of the electrolyte, there being a vent tube opening through the supplementary cover and terminating at its under surface and extending past the outer cover, means permitting the electrolyte to be tested by a syringe hydrometer which comprise a well depending from the supplementary cover into the electrolyte and having apertures in the side walls near its lower end, and having a bottom impervious to gas bubbles so that gas generated within the cell may rise around without appreciably entering said well, and a guide tube arranged through the outer cover and depending into the well and adapted to receive an hydrometer nozzle.

3. In a storage battery cell having an outer cover arranged above the level of the electrolyte and a supplementary cover arranged beneath the level of the electrolyte, there being a vent tube opening through the supplementary cover and terminating at its under surface and extending past the outer cover, means permitting the electrolyte to be tested by a syringe hydrometer, which comprise a well depending from the supplementary cover into the electrolyte and having apertures in the side walls near its lower end, and having a bottom impervious to gas bubbles so that gas generated within the cell may rise around without appreciably entering said well, and tubular means passing through an opening in the outer cover above the well for guiding the nozzle of a syringe hydrometer into the well.

4. The construction substantially as set forth in claim 3 and in which the upper end of tubular means is of funnel shape.

5. The combination substantially as described in claim 3 and in which the well has threaded connection with the supplementary cover through which it passes to provide a gas tight joint.

6. The combination as described in claim 3 and in which clearance is provided between the outer cover and the tubular means and said means is carried by the supplementary cover.

EDWARD W. SMITH.